US011126075B2

(12) United States Patent
Su et al.

(10) Patent No.: US 11,126,075 B2
(45) Date of Patent: Sep. 21, 2021

(54) PROJECTION DEVICE

(71) Applicant: Coretronic Corporation, Hsin-Chu (TW)

(72) Inventors: Tai-Ying Su, Hsin-Chu (TW); Chih-Hsien Tsai, Hsin-Chu (TW); Haw-Woei Pan, Hsin-Chu (TW); Sea-Huang Lee, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 16/939,075

(22) Filed: Jul. 27, 2020

(65) Prior Publication Data
US 2021/0063862 A1 Mar. 4, 2021

(30) Foreign Application Priority Data
Aug. 30, 2019 (CN) .......................... 201921426386.7

(51) Int. Cl.
*G03B 21/20* (2006.01)
*G03B 21/14* (2006.01)

(52) U.S. Cl.
CPC ....... *G03B 21/2066* (2013.01); *G03B 21/145* (2013.01); *G03B 21/2053* (2013.01)

(58) Field of Classification Search
CPC .... G03B 21/008; G03B 21/28; G03B 21/145; G03B 21/2013; G03B 21/2033; G03B 21/2053; G03B 21/2066; H04N 9/315; H04N 9/3141; H04N 9/3155; H04N 9/3166; H04N 9/3197
See application file for complete search history.

(56) References Cited

U.S. PATENT DOCUMENTS 7,993,011 B2   8/2011   Ikeda et al.
10,190,743 B2  1/2019   Hertel et al.
(Continued)

FOREIGN PATENT DOCUMENTS

CN   1188907     7/1998
CN   201376824   1/2010
(Continued)

OTHER PUBLICATIONS

"Search Report of Europe Counterpart Application", dated Jan. 14, 2021, p. 1-p. 7.

*Primary Examiner* — Sultan Chowdhury
(74) *Attorney, Agent, or Firm* — JCIPRNET

(57) ABSTRACT

A projection device includes: an illumination system providing an illumination beam; a light valve disposed on a transmission path of the illumination beam to modulate the illumination beam into an image beam; and a projection lens disposed on a transmission path of the image beam to project the image beam out of the projection device to form a portrait image. A center of the light valve has a first offset relative to a reference plane in a long side direction of the light valve. The reference plane includes a central axis of the projection lens. The reference plane is perpendicular to the long side direction of the light valve. A center of the portrait image has a second offset relative to the reference plane in a long side direction of the portrait image. The projection device of the invention provides a portrait image with favorable display quality.

12 Claims, 5 Drawing Sheets

(56) References Cited

U.S. PATENT DOCUMENTS

| | | | | |
|---|---|---|---|---|
| 2005/0024594 A1* | 2/2005 | Kumai | ............... | H04N 5/7458 |
| | | | | 353/33 |
| 2006/0007403 A1* | 1/2006 | Berman | ............ | G03B 21/2073 |
| | | | | 353/33 |
| 2006/0256295 A1* | 11/2006 | Lang | ................. | G03B 21/2046 |
| | | | | 353/37 |
| 2008/0266528 A1* | 10/2008 | Ikeda | ................... | G03B 21/005 |
| | | | | 353/69 |
| 2010/0309443 A1 | 12/2010 | Cheng et al. | | |
| 2012/0212841 A1 | 8/2012 | Wang et al. | | |
| 2020/0004117 A1* | 1/2020 | Lyubarsky | ........... | G03B 21/008 |

FOREIGN PATENT DOCUMENTS

| | | |
|---|---|---|
| CN | 109270682 | 1/2019 |
| JP | 2007271805 | 10/2007 |

* cited by examiner

PROJECTION DEVICE

CROSS-REFERENCE TO RELATED APPLICATION

This application claims the priority benefit of China application serial no. 201921426386.7, filed on Aug. 30, 2019. The entirety of the above-mentioned patent application is hereby incorporated by reference herein and made a part of this specification.

BACKGROUND

1. Technical Field

The invention relates to an optical device and in particular relates to a projection device.

2. Description of Related Art

In general, the image projected by a projector is a landscape image that has a horizontal width greater than a vertical height. However, for some applications (for example, elevator door projection), a portrait image with a vertical height greater than the horizontal width may also be required. One conventional technique is to set the part, which corresponds to the predetermined projected image region, in the effective region of the digital micro-mirror device (DMD) to the on-state and set the other parts, which correspond to the non-predetermined projected image region, in the effective region to the off-state. For example, when the effective region of the digital micro-mirror device is all set to the on-state, the projector can project a landscape image. When the projector is applied to elevator door projection, the part, which corresponds to the region of the elevator door, in the effective region may be set to the on-state and the other parts, which correspond to two sides of the elevator door, in the effective region may be set to the off-state. Thereby, the projector can project an image only to the region of the elevator door and not project an image to the regions at two sides of the elevator door.

However, in the above technique, the parts, which correspond to the regions at two sides of the elevator door, in the effective region may occupy a relatively large proportion of the effective region, and in general, all the effective region of the digital micro-mirror device is exposed to the incident light. Therefore, if the parts, which correspond to the non-predetermined projection region, in the effective region are set to the off-state, it will significantly reduce the utilization rate of the effective region, which will result in loss of brightness and resolution.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a projection device that provides a portrait image with favorable display quality.

Other objectives and advantages of the invention will be further understood from the technical features disclosed herein.

In order to achieve one or part or all of the above or other objectives, an embodiment of the invention provides a projection device including an illumination system, a light valve, and a projection lens. The illumination system is configured to provide an illumination beam. The light valve is disposed on a transmission path of the illumination beam to modulate the illumination beam into an image beam. The projection lens is disposed on a transmission path of the image beam to project the image beam out of the projection device to form a portrait image. A center of the light valve has a first offset with respect to a reference plane in a long side direction of the light valve, wherein the reference plane includes a central axis of the projection lens, and the reference plane is perpendicular to the long side direction of the light valve. A center of the portrait image has a second offset with respect to the reference plane in a long side direction of the portrait image.

Based on the above, in the projection device of the embodiment of the invention, the center of the light valve is offset with respect to a reference plane that includes the central axis of the projection lens in the long side direction of the light valve instead of being offset with respect to the reference plane in the short side direction of the light valve. Therefore, the image beam projected out of the projection device can directly form a portrait image. Thus, when an application requires a portrait image, the projection device of the embodiment of the invention can be used without sacrificing brightness and resolution and therefore provide a portrait image with favorable display quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
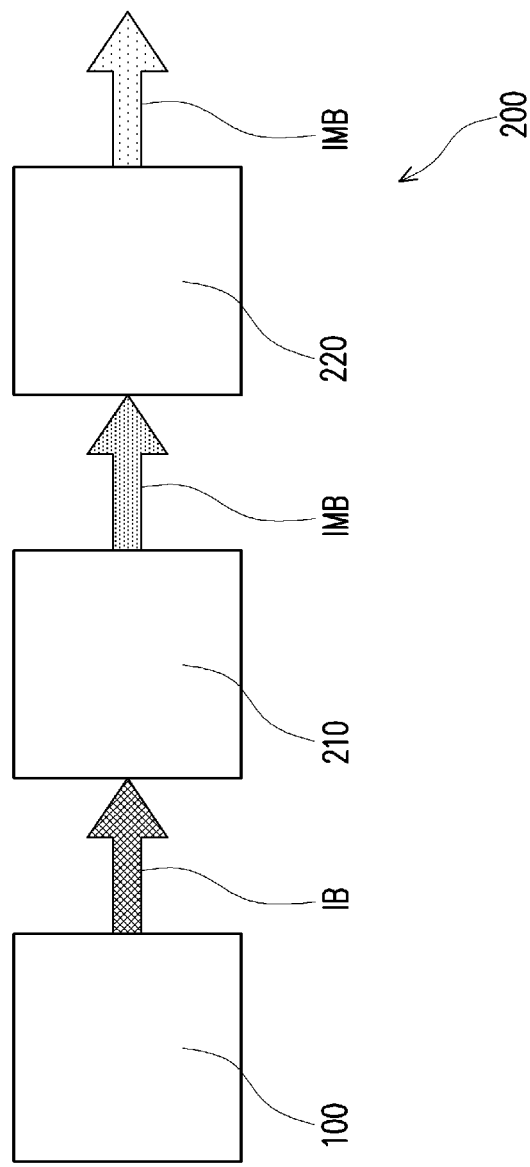
FIG. 1 is a schematic diagram of a projection device according to an embodiment of the invention.
Figure 2:
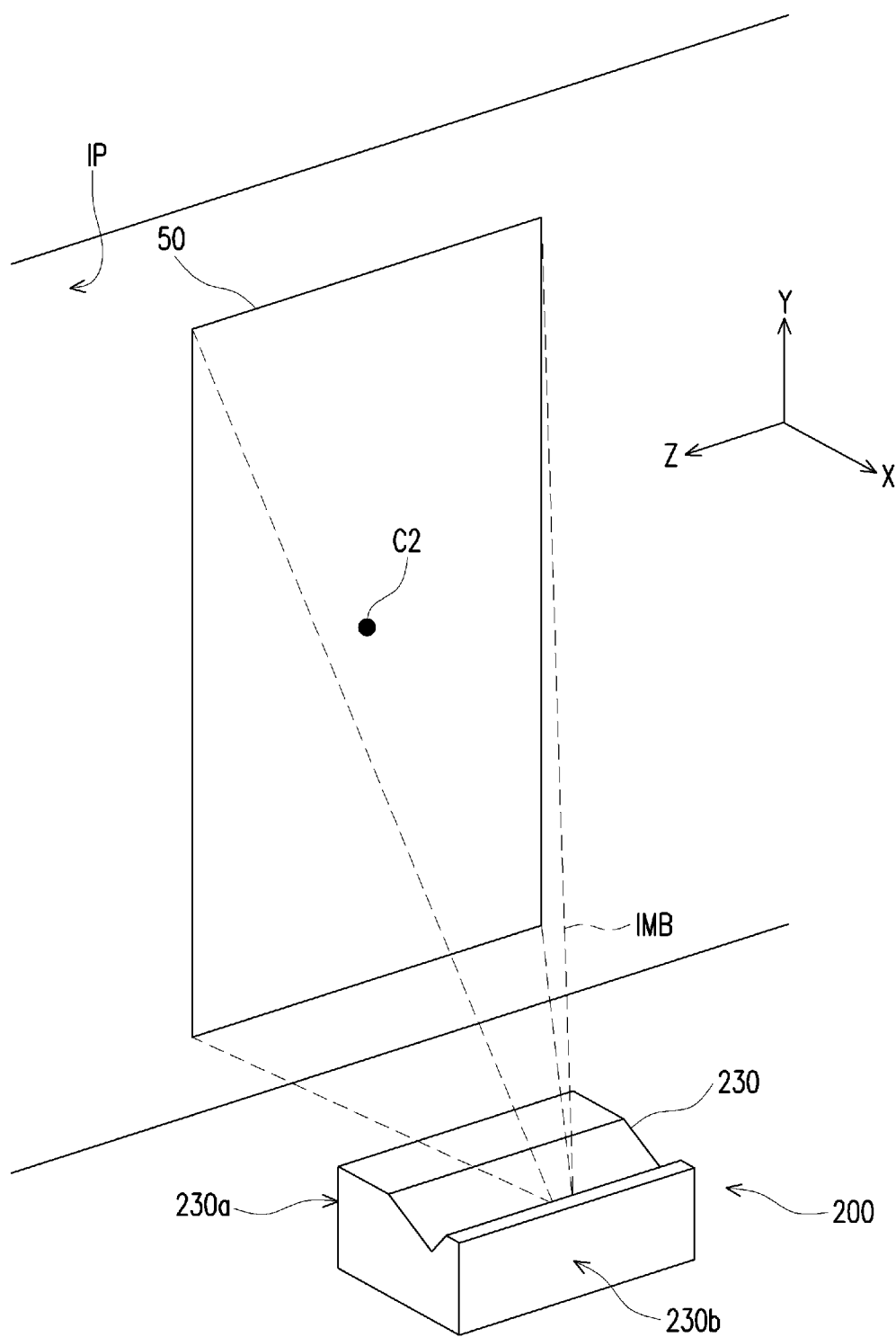
FIG. 2 is a perspective view of a projection device according to an embodiment of the invention.
Figure 3:
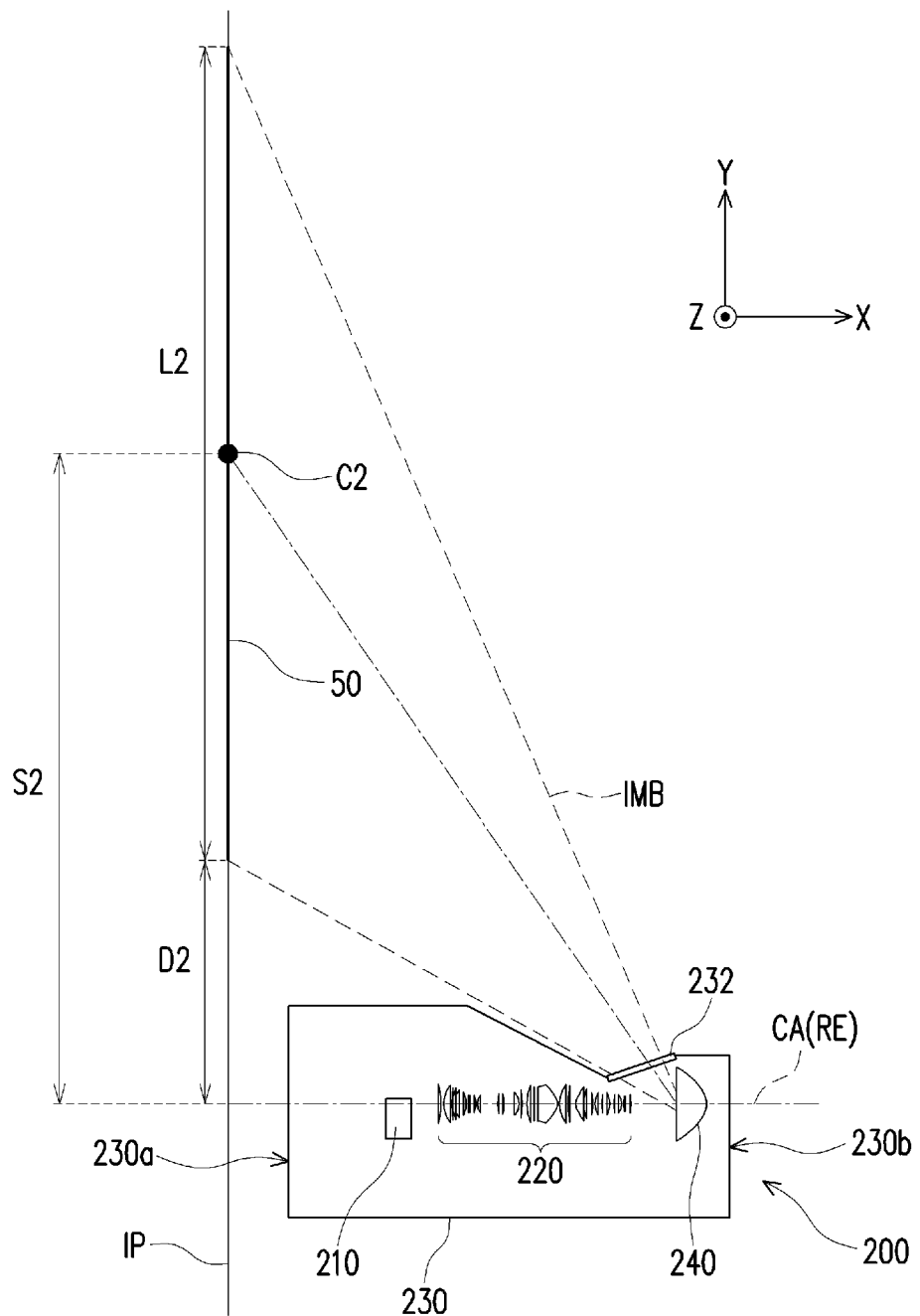
FIG. 3 is a side view showing the internal structure of the projection device of FIG. 2.
Figure 4:
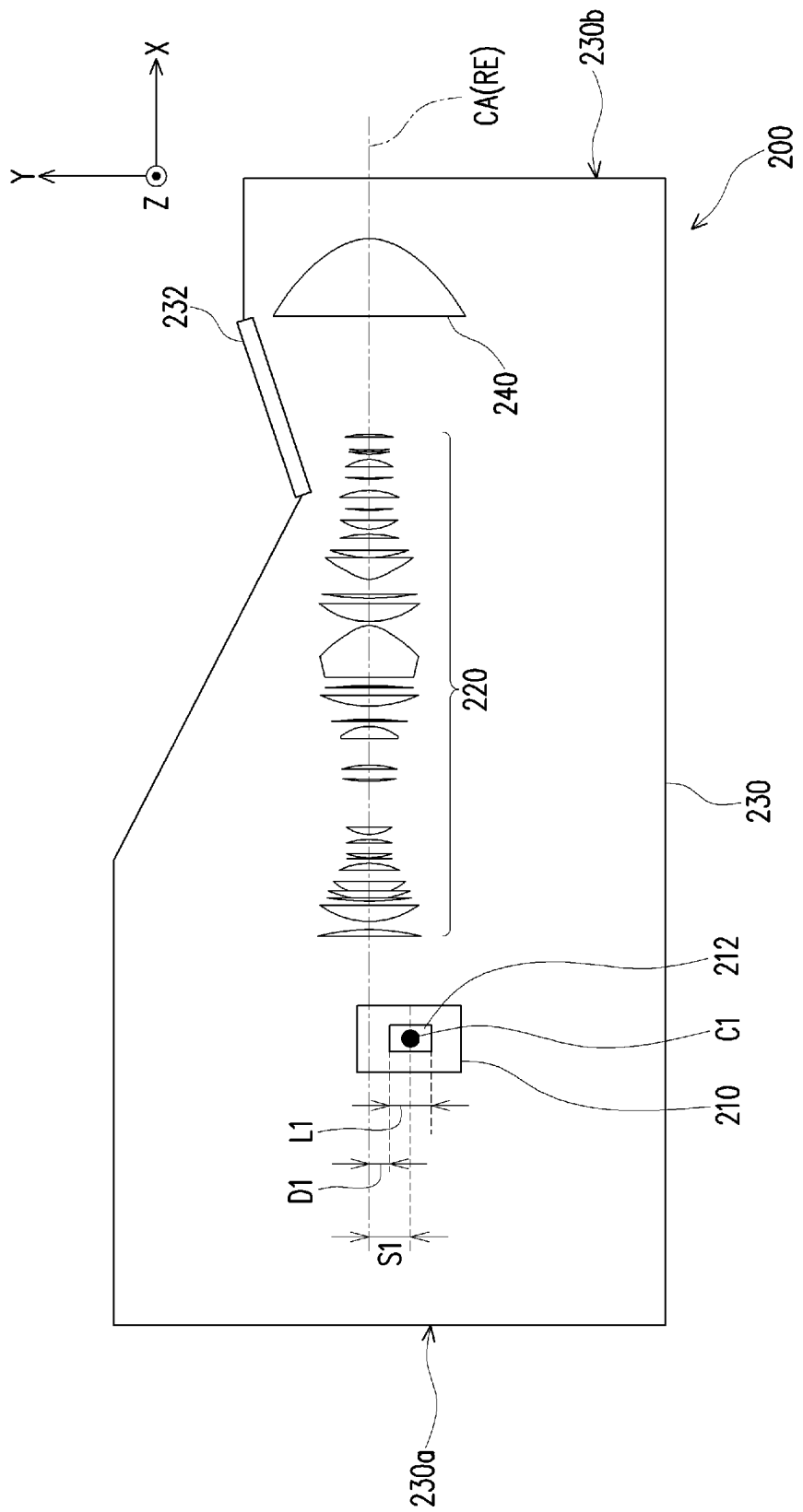
FIG. 4 is an enlarged view of the projection device of FIG. 3.
Figure 5:
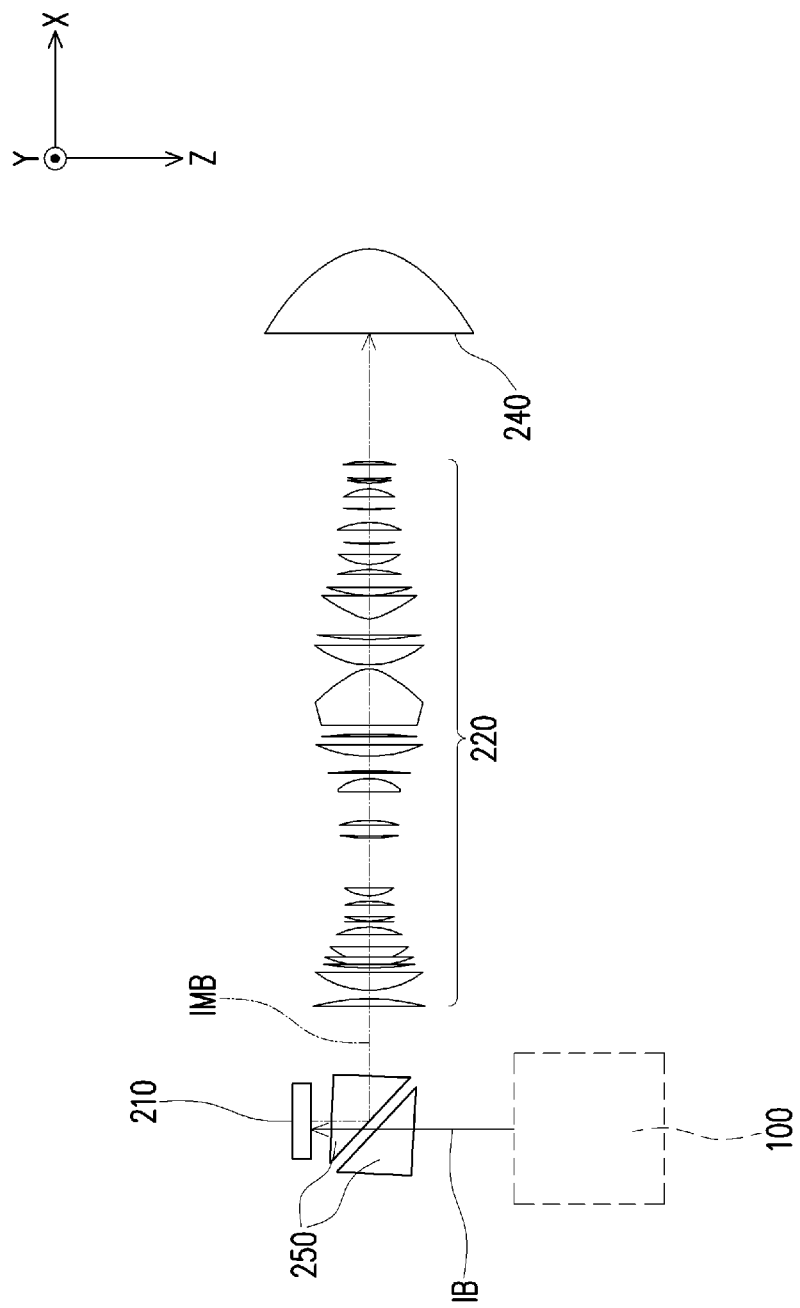
FIG. 5 is a top view of a light valve and a projection lens of FIG. 4.

FIG. 1 is a schematic diagram of a projection device according to an embodiment of the invention. FIG. 2 is a perspective view of a projection device according to an embodiment of the invention. FIG. 3 is a side view showing the internal structure of the projection device of FIG. 2. FIG. 4 is an enlarged view of the projection device of FIG. 3. FIG. 5 is a top view showing the interior of the projection device of FIG. 4. For clarity, some of the components are omitted from FIG. 3 to FIG. 5.

First, referring to FIG. 1, a projection device 200 of the present embodiment includes an illumination system 100, a light valve 210, and a projection lens 220. The illumination system 100 is configured to provide an illumination beam IB. The light valve 210 is disposed on the transmission path of the illumination beam IB to modulate the illumination beam IB into an image beam IMB. The projection lens 220 is disposed on the transmission path of the image beam IMB and is configured to project the image beam IMB to an imaging plane IP (as shown in FIG. 3 and is, for example, a surface for presenting an image, such as a screen or a wall) to form an image. After illumination beams IB of different colors are incident on the light valve 210, the light valve 210 converts the illumination beams IB of different colors into the image beam IMB according to the timings and transmits the image beam IMB to the projection lens 220. Therefore, the image beam IMB converted by the light valve 210 can be projected out of the projection device 200 by the projection lens 220 to form a colored image.

In the embodiment, the illumination system 100 includes, for example, a light source, a wavelength conversion element, and a filter element. The light source is configured to emit a beam, the wavelength conversion element is configured to convert the beam emitted by the light source into different colored lights, and the filter element is configured to enhance the color purity of the colored light so as to form the illumination beam IB. However, in other embodiments, the illumination system 100 may include a plurality of different light sources to respectively emit illumination beams IB of different colors. The disclosure is not intended to limit the illumination system 100 to certain forms or types.

In the embodiment, the light valve 210 is, for example, a reflective optical modulator such as a digital micro-mirror device (DMD) and a liquid-crystal-on-silicon panel (LCOS panel). However, in other embodiments, the light valve 210 may be a transmissive optical modulator such as a transparent liquid crystal panel, an electro-optical modulator, a maganeto-optic modulator, and an acousto-optic modulator (AOM). The disclosure is not intended to limit the light valve 210 to certain forms or types.

In the embodiment, the projection lens 220 is, for example, one or a combination of multiple optical lenses having diopter (as shown in FIG. 4). The optical lenses include, for example, non-planar lenses such as biconcave lenses, lenticular lenses, concave-convex lenses, convex-concave lenses, plano-convex lenses, and plano-concave lenses, or various combinations thereof. The disclosure is not intended to limit the projection lens 220 to certain forms or types.

Then, referring to FIG. 2 and FIG. 3, in the embodiment, the imaging plane IP is, for example, a screen or a wall, and the projection device 200 is, for example, mounted on the floor or the desktop, wherein the image beam IMB is projected upward to the imaging plane IP. However, in other embodiments, the projection lens 200 may be mounted at a higher position such as the ceiling, wherein the image beam IMB is projected downward to the imaging plane IP. For ease of description, FIG. 2 and the subsequent drawings are marked with coordinate axes, wherein the XZ plane is, for example, parallel to the floor, the desktop, or the ceiling, and the YZ plane is, for example, parallel to the screen or the wall. Therefore, the X direction and the Z direction may be regarded as the horizontal directions, and the Y direction may be regarded as the vertical direction.

As shown in FIG. 2, the projection lens 220 projects the image beam IMB out of the projection device 200 and forms a portrait image 50 on the imaging plane IP, wherein the portrait image 50 refers to an image with a vertical height greater than the horizontal width. That is, the length of the image 50 in the Y direction is greater than the length in the Z direction, and the forming method thereof will be further described in the following paragraphs.

First, referring to FIG. 4, in the long side direction of the light valve 210 (for example, the Y direction in the drawing), the center C1 of the light valve 210 has a first offset S1 with respect to a reference plane RE (for example, being parallel to the XZ plane in the drawing), wherein the reference plane RE (for example, being parallel to the XZ plane in the drawing) includes the central axis CA of the projection lens 220, and the reference plane RE (for example, being parallel to the XZ plane in the drawing) is perpendicular to the long side direction (for example, the Y direction in the drawing) of the light valve 210. Here, since an effective region 212 of the light valve 210 is rectangular, the long side direction of the light valve 210 refers to a direction parallel to the long side of the effective region 212 (for example, the Y direction in the drawing), and likewise the short side direction of the light valve 210 refers to a direction parallel to the short side of the effective region 212. The short side direction of the light valve 210 of the embodiment is, for example, parallel to the X direction in the drawing. However, in other embodiments, the short side direction of the light valve 210 may be inclined with respect to the X direction in the drawing and parallel to the XZ direction in the drawing. In addition, the effective region 212 of the light valve 210 refers to an actual optical operation region that can convert the illumination beam IB into the image beam IMB and transmit the image beam IMB to the projection lens 220. For example, if the light valve 210 is, for example, a digital micro-mirror device (DMD), the effective region 212 is, for example, a region on the digital micro-mirror device (DMD) for disposing a digital micro-mirror.

Further, referring to FIG. 3, in the long side direction of the portrait image 50 (for example, the Y direction in the drawing), the center C2 of the portrait image 50 has a second offset S2 with respect to the reference plane RE (for example, being parallel to the XZ plane in the drawing). Here, the long side direction of the portrait image 50 refers to a direction parallel to the long side of the portrait image 50 (for example, the Y direction in the drawing), and likewise the short side direction of the portrait image 50 refers to a direction parallel to the short side of the portrait image 50 (for example, the Z direction in the drawing).

Specifically, the center C1 of the light valve 210 is offset with respect to the reference plane RE (for example, being parallel to the XZ plane in the drawing) that includes the central axis CA of the projection lens 220 in the long side direction of the light valve 210 (for example, the Y direction in the drawing) instead of being offset with respect to the reference plane RE (for example, being parallel to the XZ plane in the drawing) in the short side direction of the light valve 210 (for example, the X direction in the drawing). Furthermore, the long side direction of the light valve 210 (for example, the Y direction in the drawing) is parallel to the vertical direction (for example, the Y direction in the drawing). Therefore, the image beam IMB projected out of the projection device 200 can directly form the portrait image 50 on the imaging plane IP. Thus, when an application requires a portrait image (for example, elevator door projection), the projection device 200 of the embodiment of the invention can be used without sacrificing brightness and resolution and therefore provide the portrait image 50 with favorable display quality.

It should be noted that since the image projected by the projection device 200 is a portrait image, even if the portrait image 50 needs to be limited to a predetermined portrait projection region (for example, the area of an elevator door or an advertising lightbox), the utilization rate of the effective region 212 of the light valve 210 is still relatively high. In the case where the light valve is a digital micro-mirror device (DMD), the digital micro-mirror on the effective region 212 can transmit the corresponding image beam IMB to the projection lens 220 when it is in the on-state, and guide the corresponding beam outside the projection lens 220 when it is in the off-state. That is to say, only a small part of the effective region 212 may be set to the off-state. In some embodiments, the ratio of the portrait image 50 to the effective projection region to which the effective region 212 of the light valve 210 corresponds may at least be greater than or equal to 30%, for example. In some embodiments, the ratio of the portrait image 50 to the effective projection region to which the effective region 212 of the light valve 210 corresponds may at least be greater than or equal to 95%, for example. Here, the effective projection region to which the effective region 212 of the light valve 210 corresponds refers to the region where the image beam IMB can form an image on the imaging plane IP when the effective region 212 of the light valve 210 is all set to the on-state.

In some embodiments, the difference between the aspect ratio of the portrait image 50 and the aspect ratio of the effective region 212 of the light valve 210 is greater than 0% and less than or equal to 10%, for example. Alternatively, in some embodiments, the aspect ratio of the portrait image 50 and the aspect ratio of the effective region 212 of the light valve 210 are substantially the same. That is to say, in some embodiments, the effective region 212 of the light valve 210 may all be set to the on-state, and it is not required to set a part of the effective region 212 to the off-state, so as to achieve better light utilization rate.

Referring to FIG. 3 and FIG. 4, the long side direction of the light valve 210 (for example, the Y direction in the drawing) is parallel to the long side direction of the portrait image 50 (for example, the Y direction in the drawing) and perpendicular to the short side direction of the portrait image 50 (for example, the Z direction in the drawing). The short side direction of the light valve 210 (for example, the X direction in the drawing) is perpendicular to the long side direction of the portrait image 50 (for example, the Y direction in the drawing) and perpendicular to the short side direction of the portrait image 50 (for example, the Z direction in the drawing). The central axis CA of the projection lens 220 is perpendicular to the long side direction of the light valve 210 (for example, the Y direction in the drawing) and parallel to the short side direction of the light valve 210 (for example, the X direction in the drawing). The reference plane RE (for example, being parallel to the XZ plane in the drawing) is perpendicular to the long side direction of the light valve 210 (for example, the Y direction in the drawing) and parallel to the short side direction of the light valve 210 (for example, the X direction in the drawing). It should be noted that, in other embodiments, the short side direction of the light valve 210 may be parallel to the XZ direction in the drawing but inclined with respect to the X direction in the drawing. Then, the short side direction of the light valve 210 may not be perpendicular to the long side direction of the portrait image 50 (for example, the Y direction in the drawing) nor perpendicular to the short side direction of the portrait image 50 (for example, the Z direction in the drawing), and the central axis CA of the projection lens 220 is not parallel to the short side direction of the light valve 210.

In the embodiment, the reference plane RE (for example, being parallel to the XZ plane in the drawing) is located between the effective region 212 of the light valve 210 and the portrait image 50. In the long side direction of the light valve 210 (for example, the Y direction in the drawing), the effective region 212 of the light valve 210 has a first length L1, and the effective region 212 of the light valve 210 is spaced from the reference plane RE (for example, being parallel to the XZ plane in the drawing) by a first distance D1. That is, the short side of the effective region 212 of the light valve 210, which is closest to the reference plane RE, is spaced from the reference plane RE by the first distance D1. In the long side direction of the portrait image 50 (for example, the Y direction in the drawing), the portrait image 50 has a second length L2, and the portrait image 50 is spaced from the reference plane RE (for example, being parallel to the XZ plane in the drawing) by a second distance D2. That is, the short side of the portrait image 50, which is closest to the reference plane RE, is spaced from the reference plane RE by the second distance D2, wherein the ratio of the first distance D1 to the first length L1 is substantially equal to the ratio of the second distance D2 to the second length L2.

In addition, the projection device 200 further includes a housing 230 for accommodating the illumination system 100 (not shown), the light valve 210, and the projection lens 220. The housing 230 has a surface 230a and/or a surface 230b parallel to the portrait image 50. The surface 230a of the housing 230 faces the portrait image 50, and the surface 230b of the housing 230 faces away from the portrait image 50 and is opposite to the surface 230a. The width direction of the surface 230a and/or the surface 230b (referring to FIG. 2; for example, the Z direction in the drawing) is parallel to the short side direction of the portrait image 50 (for example, the Z direction in the drawing). In the embodiment, the surface 230a and/or the surface 230b of the housing 230 is, for example, rectangular, and the horizontal width of the surface 230a and/or the surface 230b is greater than the vertical height thereof. Therefore, the width direction of the surface 230a and/or the surface 230b refers to the long side direction of the surface 230a and/or the surface 230b, that is, a direction parallel to the long side of the surface 230a and/or the surface 230b (for example, the Z direction in the drawing). However, in other embodiments, the horizontal width of the surface 230a and/or the surface 230b of the housing 230 may be, for example, less than the vertical height thereof. Therefore, the width direction of the surface 230a and/or the surface 230b refers to the short side direction of the surface 230a and/or the surface 230b, that is, a direction parallel to the short side of the surface 230a and/or the surface 230b. Nevertheless, in other embodiments, the horizontal width of the surface 230a and/or the surface 230b of the housing 230 may be equal to the vertical height thereof, for example, but the invention is not limited thereto.

As shown in FIG. 3 to FIG. 5, the projection device 200 further includes a light path turning element 240 for reflecting the image beam IMB from the projection lens 220 to the imaging plane IP so as to form the aforementioned portrait image 50. The light path turning element 240 is, for example, a concave mirror. As shown in FIG. 3, a line connecting the center C2 of the portrait image 50 and any point on the light path turning element 240, the central axis CA of the projection lens 220, and an extension line of the center C2 of the portrait image 50 in the long side direction of the portrait image 50 (for example, the Y direction in the drawing) are connected to form a triangle. Here, the extension line of the center C2 of the portrait image 50 in the long side direction of the portrait image 50 (for example, the Y direction in the drawing) is, for example, a line connecting the center C2 of the portrait image 50 and the central axis CA of the projection lens 220 in the long side direction of the portrait image 50 (for example, the Y direction in the drawing). That is to say, the central axis CA of the projection lens 220 and the center C2 of the portrait image 50 are located on the same vertical plane (for example, the XY plane in the drawing).

In addition, as shown in FIG. 3 and FIG. 4, the housing 230 of the projection device 200 may include a light-transmissive cover plate 232 that is disposed on the light path turning element 240 and disposed on the transmission path of the image beam IMB projected by the projection lens 220. The light-transmissive cover plate 232 prevents dust from adhering to the light path turning element 240 to avoid influence on the optical efficiency of the projection device 200.

Moreover, in some embodiments, the projection device 200 may optionally include an optical element having a function of light concentration, refraction, or reflection for guiding the illumination beam IB from the illumination system 100 to the light valve 210 and/or for guiding the image beam IMB from the light valve 210 to the projection lens 220. For example, as shown in FIG. 5, the projection device 200 further includes an optical mirror group 250. The optical mirror group 250 is disposed on the transmission path of the illumination beam IB from the illumination system 100 to guide the illumination beam IB to the light valve 210 and guide the image beam IMB from the light valve 210 to the projection lens 220. It should be noted that, in order to clearly show the position of the light valve 210, the optical mirror group 250 is omitted from FIG. 3 and FIG. 4. In addition, the position of the illumination system 100 shown in FIG. 5 is merely an example and is not intended to limit the actual position of the illumination system 100. For example, a part of the illumination system 100 may be disposed above or under the optical mirror group 250 in the Y direction in the drawing. Nevertheless, the invention is not limited thereto.

In conclusion, in the projection device of the embodiment of the invention, the center of the light valve is offset with respect to the reference plane that includes the central axis of the projection lens in the long side direction of the light valve instead of being offset with respect to the reference plane in the short side direction of the light valve. Furthermore, the long side direction of the light valve is parallel to the vertical direction. Therefore, the image beam projected out of the projection device directly forms a portrait image on the imaging plane. As a result, when used for an application that requires a portrait image (for example, elevator door projection or portrait billboard projection), the projection device of the embodiment of the invention can be used without sacrificing brightness and resolution and therefore provide a portrait image with favorable display quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising:
an illumination system providing an illumination beam;
a light valve disposed on a transmission path of the illumination beam to modulate the illumination beam into an image beam; and
a projection lens disposed on a transmission path of the image beam to project the image beam out of the projection device to form a portrait image,
wherein a center of the light valve has a first offset with respect to a reference plane in a long side direction of the light valve, wherein the reference plane comprises a central axis of the projection lens, and the reference plane is perpendicular to the long side direction of the light valve; and
a center of the portrait image has a second offset with respect to the reference plane in a long side direction of the portrait image, wherein:
in the long side direction of the light valve, an effective region of the light valve has a first length, and the effective region of the light valve is spaced from the reference plane by a first distance; and
in the long side direction of the portrait image, the portrait image has a second length, and the portrait image is spaced from the reference plane by a second distance, wherein a ratio of the first distance to the first length is equal to a ratio of the second distance to the second length.

2. The projection device according to claim 1, wherein the long side direction of the light valve is parallel to the long side direction of the portrait image.

3. The projection device according to claim 1, wherein the reference plane is parallel to a short side direction of the light valve.

4. The projection device according to claim 1, wherein the reference plane is located between the effective region of the light valve and the portrait image.

5. The projection device according to claim 1, further comprising a housing configured to accommodate the illumination system, the light valve, and the projection lens, wherein the housing has a surface parallel to the portrait image, and a width direction of the surface is parallel to a short side direction of the portrait image.

6. The projection device according to claim 5, further comprising a light path turning element, wherein the light path turning element is configured to reflect the image beam from the projection lens to an imaging plane to form the portrait image.

7. The projection device according to claim 6, wherein the housing comprises a light-transmissive cover plate, and the light-transmissive cover plate is disposed on the light path turning element and disposed on the transmission path of the image beam projected by the projection lens.

8. The projection device according to claim 6, wherein a line connecting the center of the portrait image and any point on the light path turning element, the central axis of the projection lens, and an extension line of the center of the portrait image in the long side direction of the portrait image are connected to form a triangle.

9. A projection device, comprising:
an illumination system providing an illumination beam;
a light valve disposed on a transmission path of the illumination beam to modulate the illumination beam into an image beam; and
a projection lens disposed on a transmission path of the image beam to project the image beam out of the projection device to form a portrait image,
wherein a center of the light valve has a first offset with respect to a reference plane in a long side direction of the light valve, wherein the reference plane comprises a central axis of the projection lens, and the reference plane is perpendicular to the long side direction of the light valve; and
a center of the portrait image has a second offset with respect to the reference plane in a long side direction of the portrait image,
wherein a ratio of the portrait image to an effective projection region, to which an effective region of the light valve corresponds, is greater than or equal to 30%.

10. A projection device, comprising:
an illumination system providing an illumination beam;
a light valve disposed on a transmission path of the illumination beam to modulate the illumination beam into an image beam; and
a projection lens disposed on a transmission path of the image beam to project the image beam out of the projection device to form a portrait image,
wherein a center of the light valve has a first offset with respect to a reference plane in a long side direction of the light valve, wherein the reference plane comprises a central axis of the projection lens, and the reference plane is perpendicular to the long side direction of the light valve; and
a center of the portrait image has a second offset with respect to the reference plane in a long side direction of the portrait image,
wherein a ratio of the portrait image to an effective projection region, to which an effective region of the light valve corresponds, is greater than or equal to 95%.

11. A projection device, comprising:
an illumination system providing an illumination beam;
a light valve disposed on a transmission path of the illumination beam to modulate the illumination beam into an image beam; and
a projection lens disposed on a transmission path of the image beam to project the image beam out of the projection device to form a portrait image,
wherein a center of the light valve has a first offset with respect to a reference plane in a long side direction of the light valve, wherein the reference plane comprises a central axis of the projection lens, and the reference plane is perpendicular to the long side direction of the light valve; and
a center of the portrait image has a second offset with respect to the reference plane in a long side direction of the portrait image,
wherein an aspect ratio of the portrait image is the same as an aspect ratio of an effective region of the light valve.

12. A projection device, comprising:
an illumination system providing an illumination beam;
a light valve disposed on a transmission path of the illumination beam to modulate the illumination beam into an image beam; and
a projection lens disposed on a transmission path of the image beam to project the image beam out of the projection device to form a portrait image, wherein a center of the light valve has a first offset with respect to a reference plane in a long side direction of the light valve, wherein the reference plane comprises a central axis of the projection lens, and the reference plane is perpendicular to the long side direction of the light valve; and a center of the portrait image has a second offset with respect to the reference plane in a long side direction of the portrait image, wherein a difference between an aspect ratio of the portrait image and an aspect ratio of an effective region of the light valve is greater than 0% and less than or equal to 10%.

\* \* \* \* \*